United States Patent [19]

Kawamata et al.

[11] Patent Number: 5,019,776
[45] Date of Patent: May 28, 1991

[54] MAGNETIC POSITION DETECTION APPARATUS HAVING TWO MAGNETIC RECORDING MEDIUM TRACKS WITH MAGNETORESISTORS ARRANGED IN A BRIDGE CIRCUIT SO AS TO ELIMINATE EVEN ORDER HARMONIC DISTORTION

[75] Inventors: Syooichi Kawamata; Tadashi Takahashi; Kunio Miyashita, all of Hitachi, Japan

[73] Assignee: Hitachi, Ltd., Tokyo, Japan

[21] Appl. No.: 355,343

[22] Filed: May 23, 1989

[30] Foreign Application Priority Data

May 26, 1988 [JP] Japan ................... 63-127149

[51] Int. Cl.$^5$ .................. G01B 7/14; G01B 33/02; G01P 3/42
[52] U.S. Cl. .................. 324/207.12; 324/207.21; 324/207.24; 324/235; 324/252
[58] Field of Search ............ 324/207, 208, 235, 252, 324/207.12, 207.13, 207.21, 207.22, 207.25; 338/32 R; 360/113

[56] References Cited

U.S. PATENT DOCUMENTS

| | | | |
|---|---|---|---|
| 4,616,281 | 10/1986 | Nakamura | 360/113 |
| 4,774,464 | 9/1988 | Kubota et al. | 324/208 |
| 4,818,939 | 4/1989 | Takahashi et al. | 324/208 |

*Primary Examiner*—Walter E. Snow
*Attorney, Agent, or Firm*—Antonelli, Terry, Stout & Kraus

[57] ABSTRACT

An apparatus for magnetically detecting a positional relation between first and second members the positions of which change relative to each other comprises a magnetic recording medium carried on the first member and a magnetic sensor substrate supported by the second member. Two or more tracks each including a multiplicity of magnetic poles arranged at a predetermined pitch are provided on the magnetic recording medium, corresponding to the respective phases of two or more detection signals to be detected by the apparatus and in a direction in which the positional relation between the first and second members changes. The magnetic poles in any one of the tracks are shifted with respect to the magnetic poles in the other track by an amount corresponding to a phase difference between the detection signal for the phase which corresponds to the one track and the detection signal for the phase which corresponds to the other track. The magnetic sensor substrate includes a plurality of magnetoresistive elements which are respectively provided corresponding to the tracks and the electrical resistance value of each of which changes in response to a magnetic field originating from the corresponding track. The magnetoresistive elements are combined to generate electric signals as the detection signals. Each of the magnetoresistive elements corresponding to any one of the tracks and the corresponding one of the magnetoresistive elements corresponding to the other track are placed at the same position when viewed in the direction in which the positional relation between the first and second members changes.

8 Claims, 10 Drawing Sheets

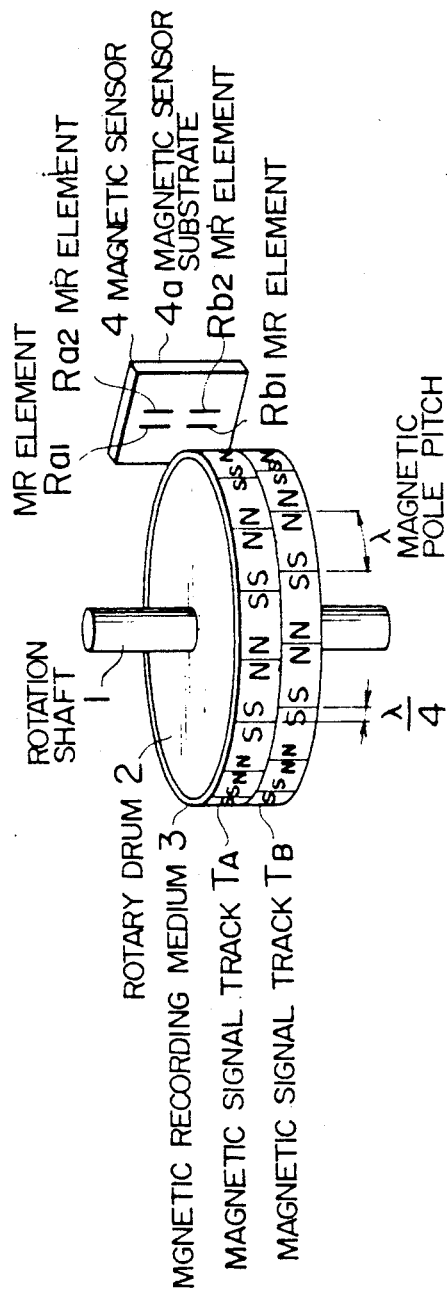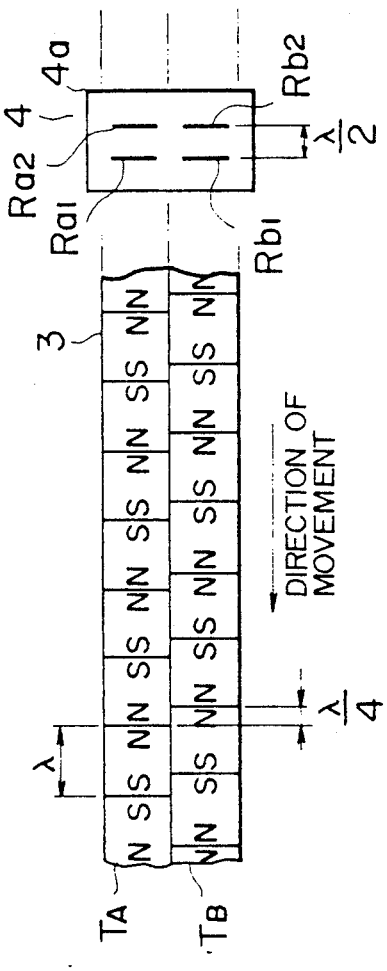

FIG.16A
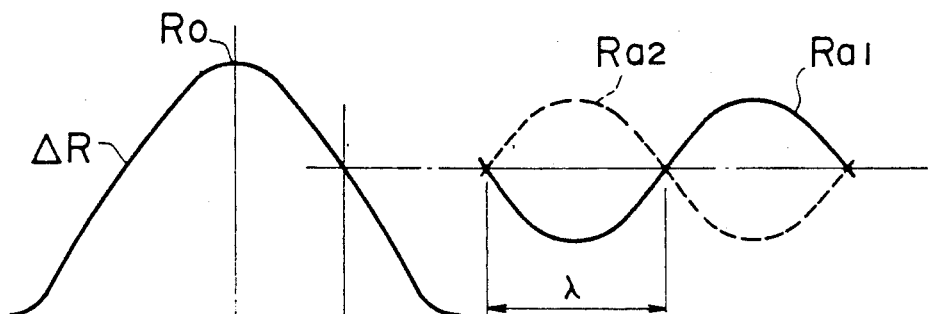
FIG.16C
FIG.16B
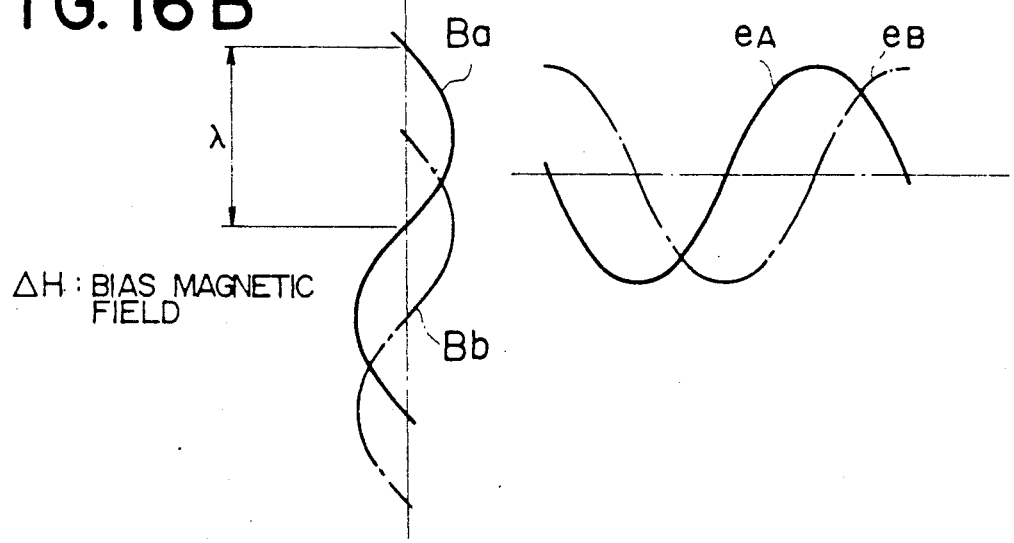
ΔH: BIAS MAGNETIC FIELD
FIG.16D
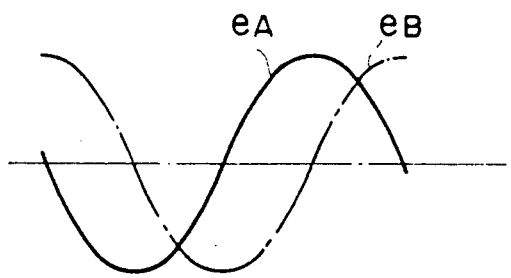
FIG.16E
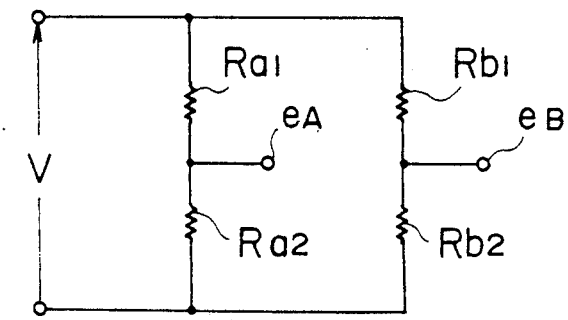

MAGNETIC POSITION DETECTION APPARATUS HAVING TWO MAGNETIC RECORDING MEDIUM TRACKS WITH MAGNETORESISTORS ARRANGED IN A BRIDGE CIRCUIT SO AS TO ELIMINATE EVEN ORDER HARMONIC DISTORTION

BACKGROUND OF THE INVENTION

The present invention relates to a magnetic position detection apparatus such as a magnetic encoder, and more particularly to the improvement on an electric signal waveform detected.

There has been proposed an apparatus for magnetically detecting a positional relation and a relative speed of two relatively moving members (or the position and speed of one of the two members relative to the other member), in which a track having magnetized (or recorded) magnetic poles is provided on a surface of one of the two members having a proximate relation to the other member upon the relative movement between the two members and a magnetic sensor including a magnetoresistive (MR) element having its electrical resistance value changing in response to the one member is provided at a location on the other member near to the one member. The intensity of a magnetic field originating from the magnetic poles and applied to the MR element changes in accordance with the relative movement between the two members. This magnetic field intensity is converted by the MR element into an electric signal to detect the positional relation between the two members on the basis of the electric signal and to detect the speed of one of the two members relative to the other member from a change of the detected positional relation.

In the conventional apparatus, a pulse-like electric signal is taken out of an MR element in order to detect the positional relation between two members. However, in order to improve the resolving power in position detection, it is desired that a signal having a sinusoidal form rather than a pulse form is taken out to detect different relative positions at each phase position of the sinusoidal signal, and such a detection apparatus has been proposed. To improve the accuracy of detection in the latter type of apparatus, it is required that a change in intensity of a magnetic field applied to an MR element which change occurs due to a change of the positional relation between the two members is reflected by an electric signal without any distortion. A change in resistance value of the MR element conformable to a change in intensity of the magnetic field applied to the MR element is small or at highest 8%. Therefore, in order that the change in intensity of the magnetic field originated from the magnetic poles in one of the two members is detected with a high output by the MR element on the other member, the MR element must be placed near to the magnetized portion of the one member. In that case, however, when the intensity of the magnetic field applied to the MR element becomes larger than a certain value, the resistance value of the MR element is saturated, thereby producing a distortion in an output signal. In order to eliminate this distortion, not only a plurality of MR elements are combined to cancel any distortion in an output signal detected by the MR elements but also a gap between the two members is adjusted so that the cancellation of distortion is effectively made.

There is a case where it is preferable to use a two-phase or multi-phase signal (for example, two signals different in phase from each other by 90°) rather than a one-phase signal as a signal representative of the positional relation between two members. For example, the use of two signals having different phases allows to detect the direction of the relative movement of two members and to improve the resolving power in position detection. In a typical conventional two-phase or multi-phase apparatus, one magnetized track is provided on one of two member and MR elements corresponding to the respective phases of signals to be detected are arranged in series with each other on a surface of the other member which is opposite to the track. In general, the one or first member is a rotary body having a track on a circumferential surface portion thereof while the other or second member as a magnetic sensor has the form of a plate. Therefore, a gap between the track and a surface of the second member changes along the longitudinal direction of the track. Accordingly, in the multi-phase apparatus, even if a gap between a MR element for one phase and the track is selected to be the optimum value, a gap between a MR element for the other phase and the track may be out of the optimum value. Also, in the case where the MR elements are arranged on the magnetic sensor or the second member along the longitudinal direction of the track on the first member, the eccentricity of the first member or the rotary body if any, causes an inconvenience that even if the optimum gap is established for a MR element for one phase, a gap(s) for a MR element(s) for the other phase(s) deviate from the optimum values. Accordingly, it is difficult to simultaneously establish the optimum gaps for all the MR elements.

In U.S. Pat. No. 4,818,939 assigned to the same assignee of the present application, countermeasure for a third-order harmonic distortion is proposed. However no consideration is made as to removal of a second-order (or even-order) harmonic distortion which remains even if third-order harmonic distortion is removed.

In U.S. Pat. No. 4,774,464 also assigned to the same assignee, a magnetic rotary sensor for detecting absolute position of rotary body is proposed. In U.S. Pat. No. 4,774,464 it is shown that the magnetizings of two magnetic tracks are shifted by P/4, where P is the field pitch. However, it is not shown to remove an even order harmonic component and to also increase the amount of output by constructing MR elements in a bridge structure.

SUMMARY OF THE INVENTION

An object of the present invention is to provide a magnetic position detection apparatus in which a multi-phase position signal representative of a positional relation between one of two members magnetized for detection of a relative position and the other member having MR elements can be obtained without the second-order harmonic.

In a magnetic position detection apparatus according to the present invention, a plurality of tracks equal in number to and respectively corresponding to the phases of signals to be taken out from the apparatus are provided on one of two relatively moving members. In the tracks, a multiplicity of magnetic poles are magnetized or recorded with the same pitch in each track but with phases shifted from each other between the adjacent tracks in accordance with the phase differences between the signals to be taken out. MR elements corresponding to the respective phases are provided on the same plate opposite to the corresponding tracks. The MR elements for the respective phases are disposed at the same position when viewed in the direction of the relative movement between the two members. For example, in the case where the one or first member is a rotary body with tracks provided thereon in the direction of circumference of the rotary body, MR elements for the respective phases are disposed in a direction perpendicular to the circumferential direction. Thereby, the gaps between the MR elements for the respective phases and the corresponding tracks become equal to each other even if the form of the track is circular and the first member involves an eccentricity. In other words, when a gap between an MR element for a certain phase and the corresponding track is adjusted to take the optimum value, a gap between a MR element for the other phase and the corresponding track can be also adjusted to take the optimum value. Since the magnetic poles are magnetized or recorded in each track with phases shifted from each other in accordance with the phase difference between the signals to be detected, signals having phases shifted from each other by a predetermined amount are outputted from the MR elements for the individual phases which are disposed at the same position when viewed in the direction of the relative movement between the tracks and the MR elements.

According to the present invention, an adjustment operation for eliminating a harmonic distortion in a detection signal for each phase can be easily performed.

In the present invention, there can be employed a structure in which the first member having the magnetized tracks provided thereon is fixed while the second member having the MR elements mounted thereon is rotated around the first member. The positional relation between the first and second members can be detected even in a stationary state of both the members since a magnetic field can be statically detected by the MR elements.

BRIEF DESCRIPTION OF THE DRAWINGS

The above-mentioned and other objects and advantages of the present invention will become apparent by reference to the following description and accompanying drawings wherein:

FIG. 1 is a perspective view of a magnetic rotary encoder as a first embodiment of a magnetic position detection apparatus according to the present invention;

FIG. 2 is an exploded view of magnetic signal tracks and MR elements in the magnetic rotary encoder shown in FIG. 1;

FIGS. 16A to 16D are views showing waveforms for explaining the operation of the magnetic encoder shown in FIG. 15, and FIG. 16E is a view showing electrical connection between MR elements in the magnetic encoder shown in FIG. 15.

DESCRIPTION OF THE PREFERRED EMBODIMENTS

Figure 3A:
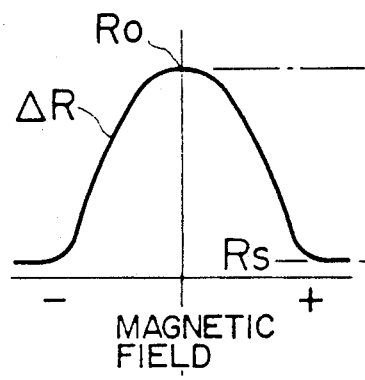
FIGS. 3A to 3D are views showing waveforms for explaining the operation of the magnetic rotary encoder shown in FIG. 1.

Embodiments of the present invention will now be explained in reference to the accompanying drawings.

FIG. 1 is a perspective view of a magnetic rotary encoder according to a first embodiment of the present invention. A first member moving relative to a second member is constructed by a rotary drum 2 which is rotatably supported on a rotation shaft 1. A magnetic recording medium 3 is carried on an outer periphery surface of the rotary drum 2. Two magnetic signal tracks $T_A$ and $T_B$ are provided in the magnetic recording medium 3. Each of the magnetic signal tracks $T_A$ and $T_B$ includes therein a multiplicity of magnetic poles N and S magnetized (or recorded) with the same pitch λ in a direction of rotation of the rotary drum 2 and the magnetic poles N and S in one of the magnetic signal tracks are shifted with respect to those in the other magnetic signal track by an amount equal to one fourth of the magnetic pole pitch λ.

The second member moving relative to the first member is a magnetic sensor 4 placed opposite to the rotary drum 2 through a minute or small gap therebetween and includes a magnetic sensor substrate 4a which forms a part of the magnetic sensor 4. MR elements $R_{a1}$, $R_{a2}$ and MR elements $R_{b1}$, $R_{b2}$ respectively corresponding to the two magnetic signal tracks $T_A$ and $T_B$ are provided on a surface of the magnetic sensor substrate 4a. The MR elements $R_{a1}$ and $R_{a2}$ are disposed with an interval therebetween equal to one half of the magnetic pole pitch $\lambda$ in the direction of rotation of the rotary drum 2 of form a first phase, and the MR elements $R_{b1}$ and $R_{b2}$ are similarly disposed to form a second phase. The MR elements $R_{a1}$ and $R_{b1}$ (or $R_{a2}$ and $R_{b2}$) are placed at the same position in the direction of rotation of the rotary drum 2. A relation of the MR elements with the magnetic tracks $T_A$ and $T_B$ is illustrated in an exploded view of FIG. 2.

The magnetic sensor substrate 4a includes a glass substrate or the like. The MR elements $R_{a1}$ to $R_{b2}$, the electrical resistance value of each of which changes in response to a magnetic field applied thereto, are formed by depositing a thin film of a ferromagnetic substance such as Ni-Fe, Ni-Co or the like on a surface of the glass substrate by means of evaporation technique or the like. The electrical resistance value of the MR element thus formed changes in proportion to the intensity of a magnetic field acting on the MR element irrespective of the direction of the magnetic field, as shown by $\Delta R$ in FIG. 3A, and saturates at a certain value $R_S$.

Figure 3C:
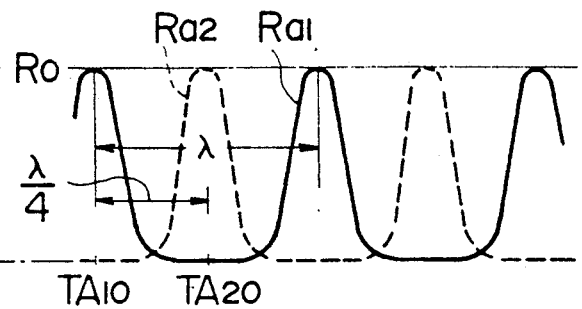
Figure 3B:
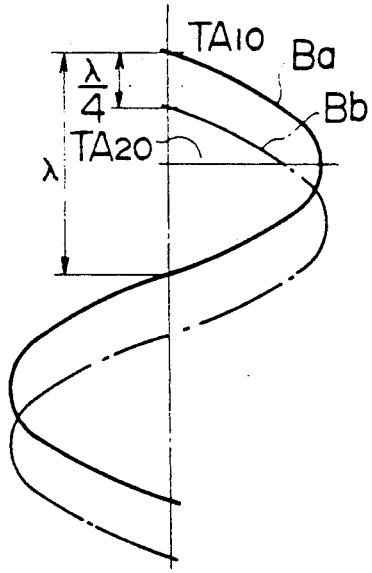

When the magnetic recording medium 3 moves with the rotation of the rotary drum 2 so that a magnetic field $B_a$ originating from the magnetic poles N and S in the magnetic signal track $T_A$ and acting on the MR elements $R_{a1}$ and $R_{a2}$ changes as shown in FIG. 3B, the electrical resistance values of the MR elements $R_{a1}$ and $R_{a2}$ change as shown in FIG. 3C. The shown example is constructed so that a magnetic field strong enough to saturate the change in resistance value of each of the MR elements $R_{a1}$ and $R_{a2}$ acts on the MR elements, whereby the amplitude (or minimum value) of the resistance of the MR element $R_{a1}$ or $R_{a2}$ has no variation even if the rotary drum 2 ecCentrically rotates to change a gap between the opposing magnetic recording medium 3 and magnetic sensor substrate 4a so that the intensity (or maximum value) of the magnetic field acts on the MR element $R_{a1}$ Or $R_{a2}$. With such a construction, the resistance value of each of the MR elements $R_{a1}$ and $R_{a2}$ changes in proportion to the intensity of the magnetic field in a weak intensity range of the magnetic field but does not change in a strong intensity range of the magnetic field.

Figure 3D:
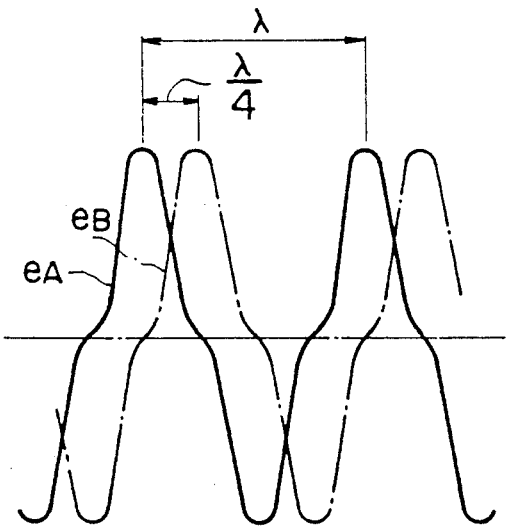
Figure 3E:
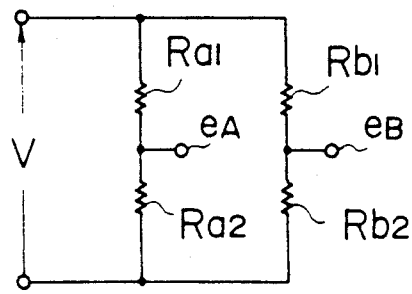
FIG. 3E is a view showing electrical connection between MR elements in the magnetic rotary encoder shown in FIG. 1.

The MR elements $R_{a1}$ and $R_{a2}$ are connected in series with each other to a DC voltage source V to form a three-terminal network as shown in FIG. 3E, and a first-phase electric signal as shown by solid line in FIG. 3D is obtained at a detection terminal $e_A$ which is a voltage dividing point.

The resistance values of the MR elements $R_{b1}$ and $R_{b2}$ corresponding to the magnetic signal track $T_B$ change like those of the MR elements $R_{a1}$ and $R_{a2}$. However, since the magnetic poles N and S in the magnetic signal track $T_B$ are shifted with respect to those in the magnetic signal track $T_A$ by one fourth of the magnetic pole pitch in the direction of rotation of the rotary drum 2, the changes in resistance value of the MR elements $R_{b1}$ and $R_{b2}$ are correspondingly shifted and hence a second-phase electric signal on a detection terminal $e_B$ (see FIG. 3E) of a three-terminal network formed by the MR elements $R_{b1}$ and $R_{b2}$ changes as shown by chained line in FIG. 3D. Namely, the first-phase electric signal $e_A$ and the second-phase electric signal $e_B$, which form a two-phase signal, are Shifted in phase by one fourth of the magnetic pole pitch $\lambda$ (or 90° in terms of electric angle).

Figure 4:
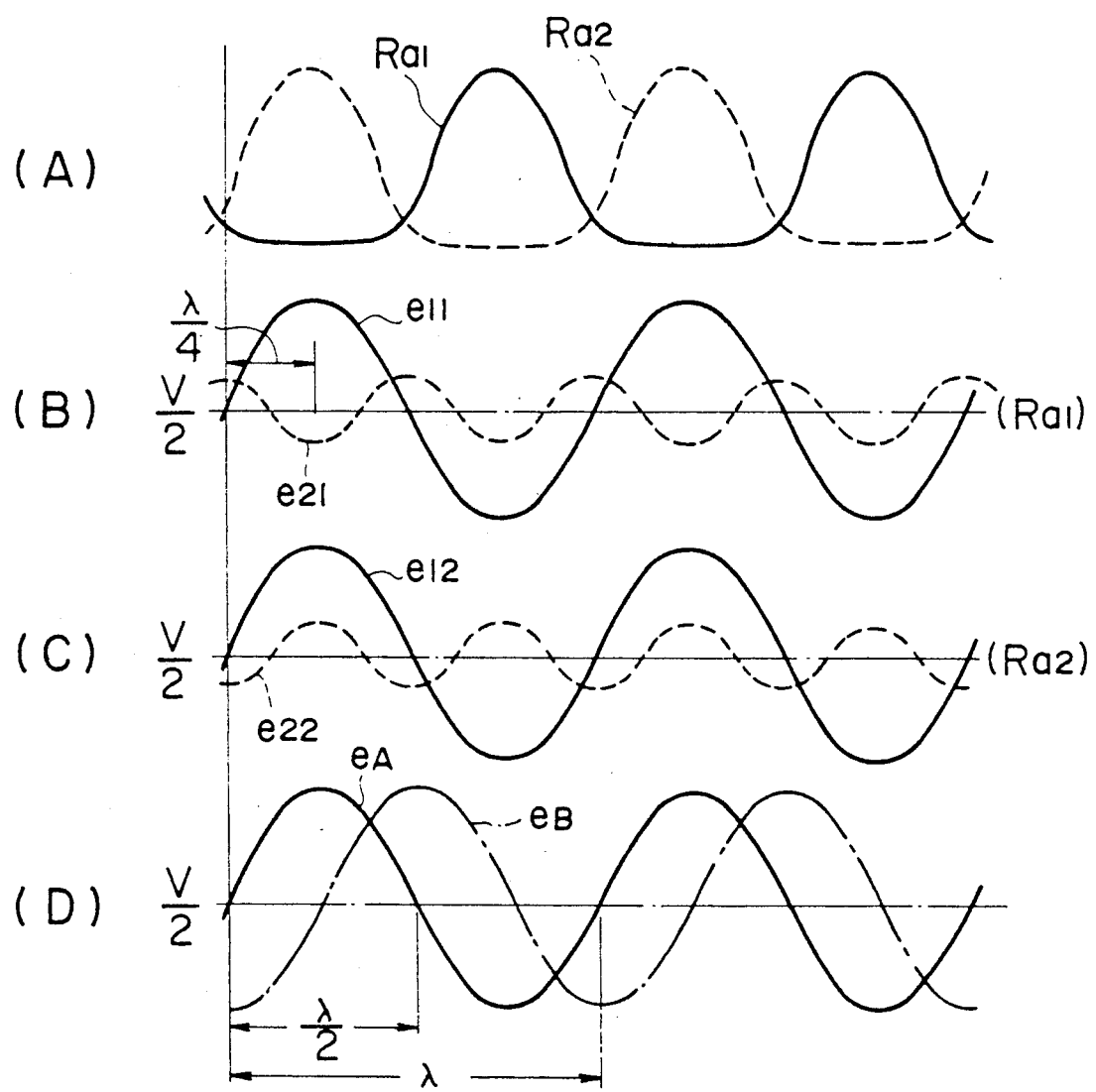
FIG. 4 is a view showing in waveform the resistance values of the MR elements in the magnetic rotary encoder shown in FIG. 1.

Since the MR elements $R_{a1}$ and $R_{a2}$ (or $R_{b1}$ and $R_{b2}$) are disposed at an interval equal to one half of the magnetic pole pitch or 180° in terms of electric angle, the electric signal $e_A$ (or $e_B$) does not essentially involve any even-order harmonic. However, if a significant or unnegligible difference in resistance value is present between the MR elements $R_{a1}$ and $R_{a2}$ (or $R_{b1}$ and $R_{b2}$) due to a positional deviation of the magnetic sensor 4, etc., the even-order harmonic is included in the electric signal $e_A$ (or $e_B$). Namely, when the resistance values of the MR elements $R_{a1}$ and $R_{a2}$ change as shown in FIG. 4A in accordance with the rotation of the track, a voltage change waveform attendant upon the change in resistance value of the MR element $R_{a1}$ can be decomposed into the fundamental component $e_{11}$ and the second-order harmonic component $e_{21}$, as shown in FIG. 4b, and a voltage change waveform attendant upon the change in resistance value of the MR element $R_{a2}$ can be decomposed into the fundamental component $a_{12}$ and the second-order harmonic component $e_{22}$, as shown in FIG. 4C. These waveform components are added to each other in the three-terminal network in which the MR elements $R_{a1}$ and $R_{a2}$ are connected in series with each other. Therefore, the second-order harmonic components $e_{21}$ and $e_{22}$ having phase reverse to each other disappear through mutual cancellation thereof and a signal voltage on the detection terminal $e_A$ includes only the fundamental component, as shown by solid line in FIG. 4D. The same holds for the electric signal $e_B$ based on the MR elements $R_{b1}$ and $R_{b2}$. However, if a significant difference in resistance value is present between the MR elements $R_{a1}$ and $R_{a2}$ (or $R_{b1}$ and $R_{b2}$), a difference incapable of being cancelled generates between the harmonic components and hence the electric signal $e_A$ (or $e_B$) involves a distortion component.

Figure 5:
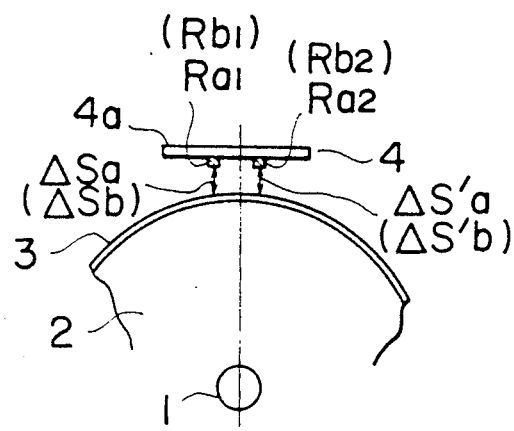
FIG. 5 is a view for explaining a gap between a rotary drum and a magnetic sensor which oppose to each other.

FIG. 5 shows a state in which the magnetic sensor 4 is normally placed with respect to the rotary drum 2. In such a state, small gaps $\Delta S_a$ and $\Delta S_a'$ between the first-phase MR elements $R_{a1}$ and $R_{a2}$ and the magnetic recording medium 3 are equal to each other. Therefore, the second-order harmonic distortion in the first-phase electric signal $e_A$ is eliminated, as has already been explained in conjunction with FIGS. 4A to 4D. The same holds for small gaps $\Delta S_b$ and $\Delta S_b'$ between the second-phase MR elements $R_{b1}$ and $R_{b2}$ and the magnetic recording medium 3 and the second-order harmonic component in the second-phase electric signal $e_B$ is also eliminated.

Figure 6:
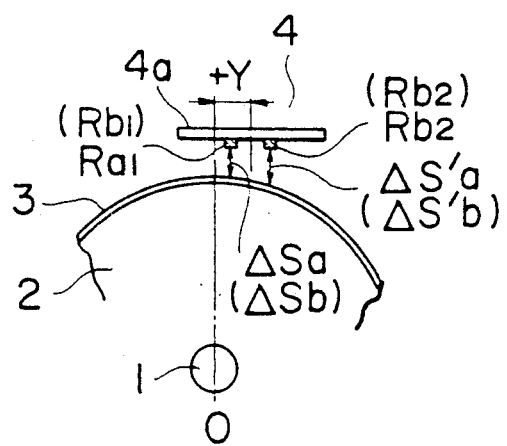
FIG. 6 is a view similar to FIG. 5 but in the case where a positional deviation is present between the rotary drum and the magnetic sensor.
Figure 7:
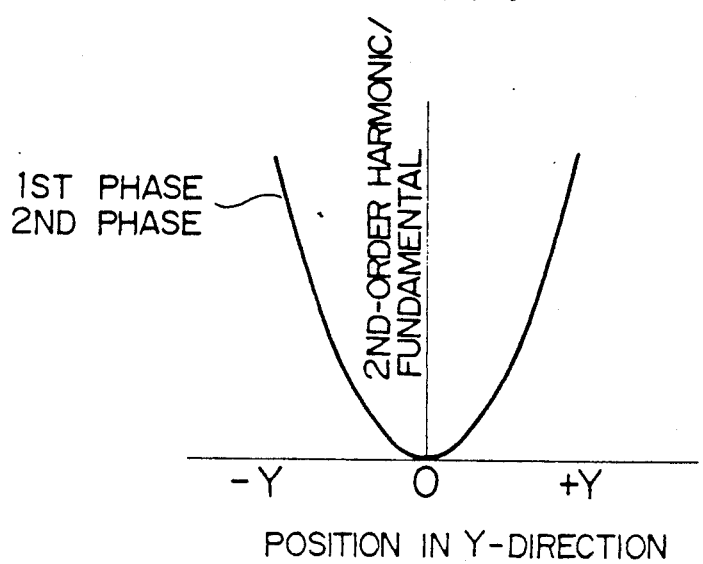
FIG. 7 is a characteristic view show in distortion in the case where a positional deviation is present between the rotary drum and the magnetic sensor.

FIG. 6 shows a state in which the magnetic sensor 4 is positionally deviated with respect to the rotary drum 2 by $+Y$ in a tangental direction. In that state, a difference ($\Delta S_a < \Delta S_a'$) is produced between the small gaps $\Delta S_a$ and $\Delta S_a'$ between the first-phase MR elements $R_{a1}$ and $R_{a2}$ and the magnetic recording medium 3 due to the roundness of the rotary drum 2 to result in the generation of a second-order harmonic distortion since the above-mentioned cancellation is not made. Similarly, a difference ($\Delta S_b < \Delta S_b'$) is produced between small gaps $\Delta S_b$ and $\Delta S_b'$ between the second-phase MR elements $R_{b1}$ and $R_{b2}$ and the magnetic recording medium 3. However, the difference between $\Delta S_a$ and $\Delta S_a'$ and the difference between $\Delta S_b$ and $\Delta S_b'$ are equal to each other. Also, a change of the ratio of the second-order harmonic component to the fundamental component for the first-phase signal obtained from the MR elements $R_{a1}$ and $R_{a2}$ which change takes place in accordance with the positional deviation of the magnetic sensor in the Y-direction shown in FIG. 6 is the same as a change of the ratio of the second-order harmonic component to the fundamental component for the second-phase signal obtained from the MR element $R_{b1}$ and $R_{b2}$, as shown in FIG. 7. Namely, the amplitude of the first-phase signal $e_A$ and the amplitude of the second-phase signal $e_B$ change similarly except for the presence of a phase difference therebetween. As a result, the positional deviation of the magnetic sensor in the direction of Y causes to generate the second-order harmonic components with the same amplitude in the first-phase electric signal $e_A$ and the second-phase electric signal $e_B$. Accordingly, if adjustment is made such that the second-order harmonic component in the first-phase electric signal is eliminated, the second-order harmonic component in the second-phase or other-phase electric signal can be also extinguished.

Figure 8A:
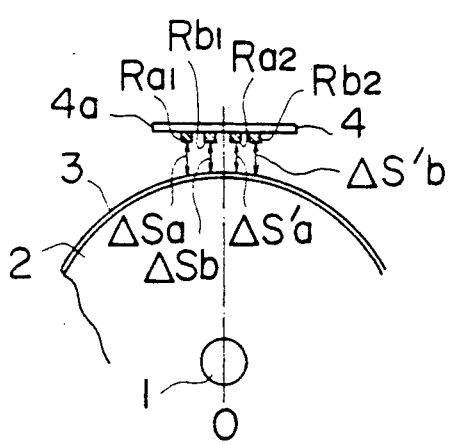
FIG. 8A is a view for explaining a gap between a rotary drum and a magnetic sensor in the conventional magnetic rotary encoder.
Figure 8B:
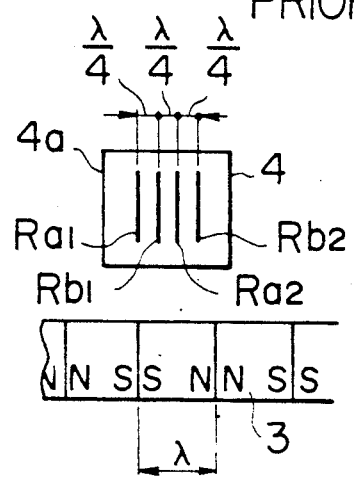
FIG. 8B is an exploded view of the conventional magnetic rotary encoder shown in FIG. 8A.
Figure 9:
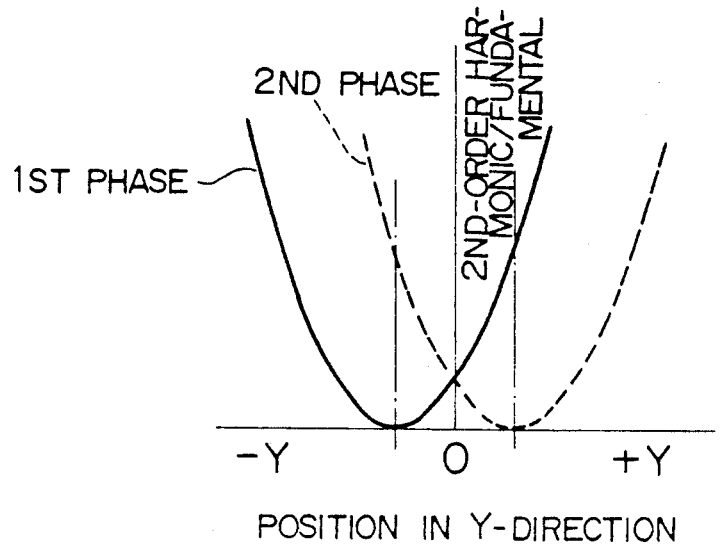
FIG. 9 is a characteristic view showing distortion in the case where a positional deviation is present between the rotary drum and the magnetic sensor in the conventional magnetic rotary encoder shown in FIG. 8A.

In this type of conventional magnetic rotary encoder, as shown in FIGS. 8A and 8B, first-phase MR elements $R_{a1}$ and $R_{a2}$ and second-phase MR elements $R_{b1}$ and $R_{b2}$ are disposed in a shifted fashion in the direction of rotation of a rotary drum 2 but opposite to a single magnetic signal track. Therefore, it is not possible to make all of small gaps $\Delta S_a$ to $\Delta S_b'$ between a round magnetic recording medium 3 and the four MR elements $R_{a1}$ to $R_{b2}$ equal to each other. Accordingly, a change of the ratio of the second-order harmonic component to the fundamental component for a first-phase electric signal $e_A$ and a change of such ratio for a second-phase electric signal $e_B$ attendant upon movement (or positional deviation) of a magnetic sensor 4 in the Y-direction are different from each other, as shown in FIG. 9. Namely, the second-order harmonic components involved in the first-phase and second-phase electric signals $e_A$ and $e_B$ cannot be eliminated since the amplitudes thereof are different from each other even if any difference in amplitude resulting from the phase difference is removed.

Figure 10:
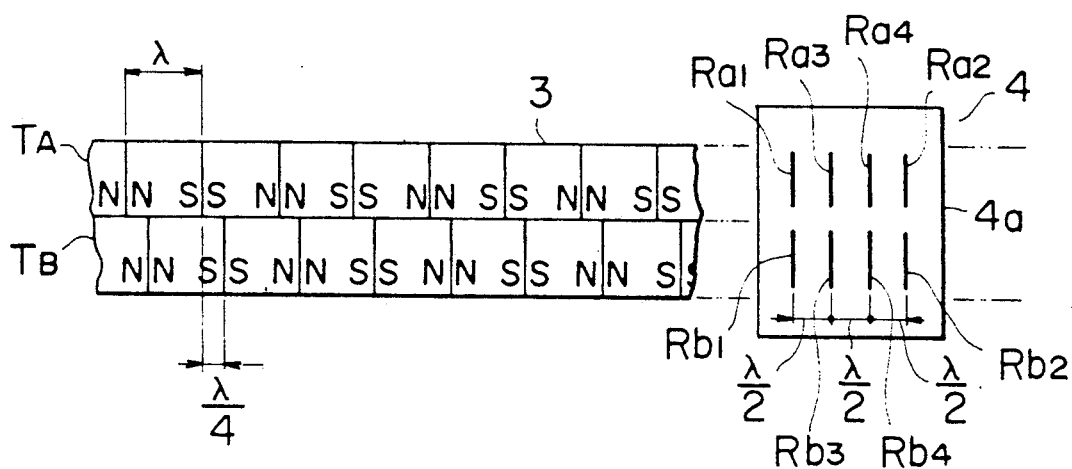
FIG. 10 is an exploded view of a magnetic rotary encoder according to a second embodiment of the present invention.
Figure 11:
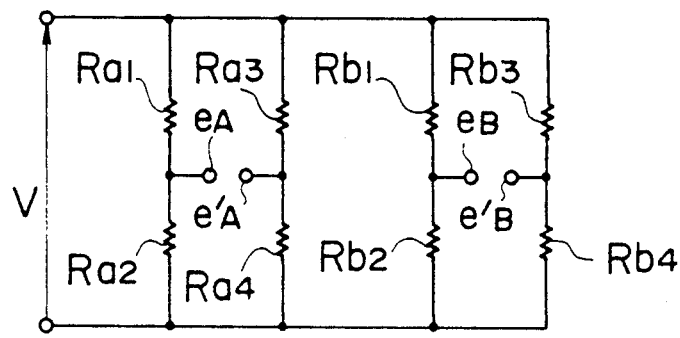
FIG. 11 is a view showing electrical connection between MR elements in the magnetic rotary encoder shown in FIG. 10.

FIG. 10 shows an exploded view of a magnetic rotary encoder according to a second embodiment of the present invention. The magnetic rotary encoder according to the present embodiment has an advantage that a large electric signal can be obtained to provide an improved S/N ratio since a first-phase electric signal $e_A$-$e_A'$ and a second-phase electric signal $e_B$-$e_B'$ are obtained by a bridge circuit of four MR elements $R_{a1}$ to $R_{a4}$ and a bridge circuit of four MR elements $R_{b1}$ to $R_{b4}$, respectively, as shown in FIG. 11.

However, when a bridge circuit is composed, the number of MR elements increase, and it becomes such that the MR elements $R_{a1}$ and $R_{a2}$, and MR elements $R_{b1}$ and $R_{b2}$ are situated further from the center of sensor and minute gap between the MR elements and the magnetic recording medium 3 becomes large, therefore the influence of the second-order harmonic becomes large. The MR elements $R_{a1}$ to $R_{a4}$ constituting the first phase are arranged in opposite to a first magnetic signal track $T_A$ of a magnetic recording medium 3, at an interval equal to one half of the magnetic pole pitch $\lambda$ and in the order of $R_{a1}$, $R_{a3}$, $R_{a4}$ and $R_{a2}$. Since the MR elements $R_{a1}$ and $R_{a2}$ (or $R_{a3}$ and $R_{a4}$) positioned symmetrically with each other about the center of the arrangement are connected in series with each other, an electric potential on a detection terminal $e_A$ (or $e_A'$) involves no second-order harmonic component, for the same reasons which have already been explained in conjunction with the first embodiment. Accordingly, the first-phase electric signal $e_A$-$e_A'$ free of any distortion can be obtained.

Similarly, the MR elements $R_{b1}$ to $R_{b4}$ constituting the second phase are arranged opposite to a second magnetic signal track $T_B$ of the magnetic recording medium 3, at an interval equal to one half of the magnetic pole pitch $\lambda$ and in the order of $R_{b1}$, $R_{b3}$, $R_{b4}$ and $R_{b2}$. Since the MR elements $R_{b1}$ and $R_{b2}$ (or $R_{b3}$, $R_{b4}$) positioned symmetrically with respect to each other about the center of the arrangement are connected in series with each other, the second-phase electric signal $e_B$-$e_B'$ free of any distortion can be obtained, like the first-phase electric signal.

Figure 12:
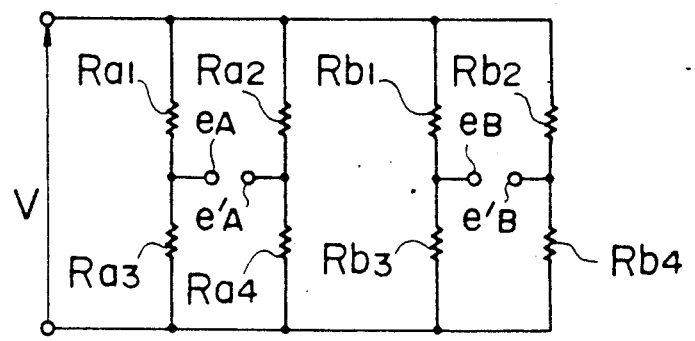
FIG. 12 is a view showing another electrical connection between MR elements in the magnetic rotary encoder shown in FIG. 10.

Connection of MR elements may be made also such that with respect to the center of arrangements of MR elements, elements at the left of the center and those at the right of the center in view of direction of rotation of the drum are connected in series respectively and are formed in bridge arrangement as shown in FIG. 12. That is, it is possible to form a bridge circuit as shown in FIG. 12 by connecting MR elements $R_{a2}$ and $R_{a4}$ at the right of the center in series, MR elements $R_{a3}$ and $R_{a1}$ at the left, MR elements $R_{b2}$ and $R_{b4}$ at the right, MR elements $R_{b3}$ and $R_{b1}$ at the left respectively, and arranging the series circuits to form the bridge circuit.

Figure 13:
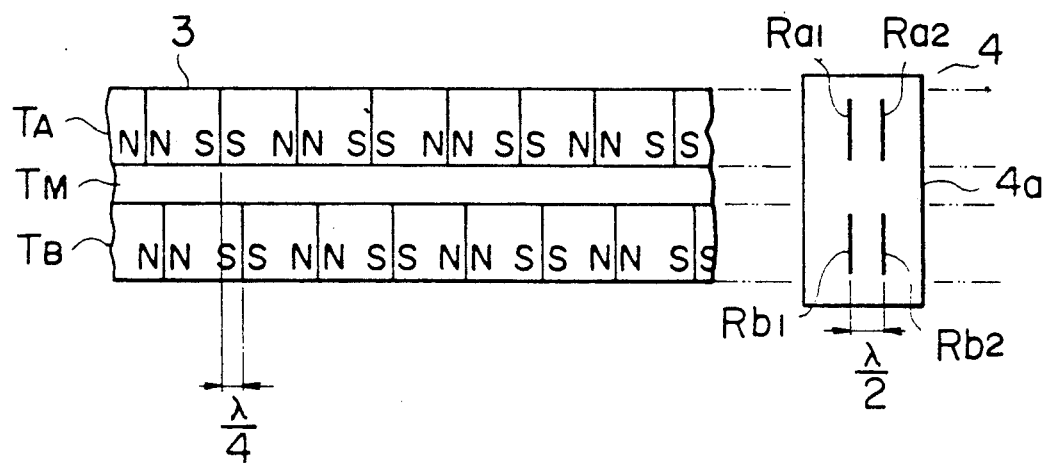
FIG. 13 is an exploded view of a magnetic rotary encoder according to a third embodiment of the present invention.
Figure 14:
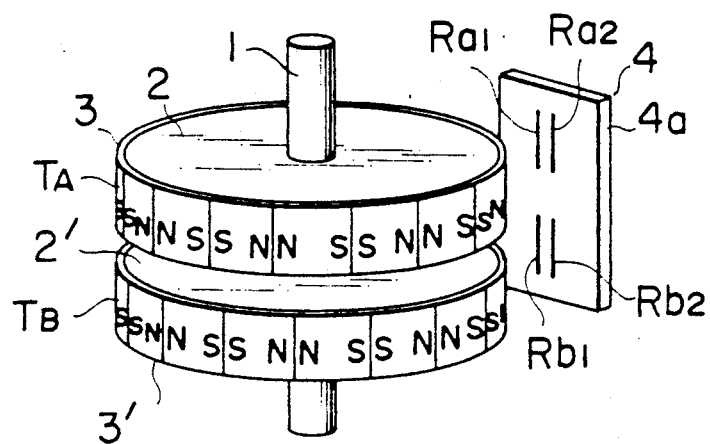
FIG. 14 is a perspective view of the magnetic rotary encoder shown in FIG. 13.

FIGS. 13 and 14 respectively show an exploded view of and a perspective view of a magnetic rotary encoder according to a third embodiment of the present invention. The present embodiment is different from the first embodiment in that a non-magnetized zone $T_M$ is provided between the magnetic signal tracks $T_A$ and $T_B$ on the magnetic recording medium 3, thereby preventing any interference of a magnetic field from occurring between both the magnetic signal tracks. Such a construction of the present embodiment can be readily realized in such a manner that discrete magnetic recording media 3 and 3' are bisectionally provided on rotary drums 2 and 2' separated from each other in the direction of rotation axis with a gap kept therebetween, thereby magnetically isolating the magnetic signal tracks $T_A$ and $T_B$ from each other. Alternatively, the structure can be realized through properly controlled magnetization for two magnetic signal tracks $T_A$ and $T_B$ even in the case where a continuous magnetic recording medium is used.

Figure 15:
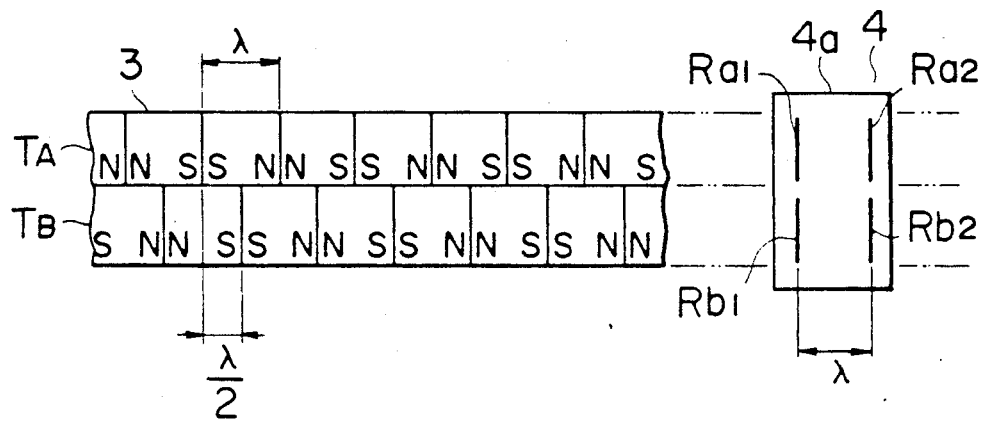
FIG. 15 is an exploded view of a magnetic rotary encoder according to a fourth embodiment of the present invention.

FIG. 15 shows an exploded view of a magnetic rotary encoder according to a fourth embodiment of the present invention in which a bias magnetic field is applied to a MR element having such an electrical resistance value change characteristic as shown in FIG. 3A, thereby moving an operating point in a plus (+) direction or minus (−) direction of a magnetic field acting on the MR element. The bias magnetic field is applied to each MR element by use of a proper means such as a magnet (not shown). Waveforms for the resistances of MR elements, magnetic field and electric output signals in the present embodiment are illustrated in FIGS. 16A to 16D. FIG. 16A shows, like FIG. 3A, a change in resistance value of the MR element with respect to a change in intensity of a magnetic field. When an input magnetic field $B_a$ changes as shown in FIG. 16B in a state in which a bias field $\Delta H$ is applied, the resistance value of the MR element changes as shown by solid line $R_{a1}$ in FIG. 16C. When an input magnetic field $B_b$ changes as shown in FIG. 16B, the resistance value of the MR element changes as shown by dotted line $R_{a2}$ in FIG. 16C. First-phase MR elements $R_{a1}$ and $R_{a2}$ and second-phase MR elements $R_{b1}$ and $R_{b2}$ are connected as shown in FIG. 16E in a manner similar to FIG. 14E, so that a first-phase electric signal $e_A$ and a second-phase electric signal $e_B$ as shown in FIG. 16D are outputted. In the present embodiment, since an operating point of the MR element on its characteristic curve is present on a slope portion of the characteristic curved, an electric signal for one cycle shown in FIG. 16D corresponds to one cycle of the magnetic signal track as shown by $B_a$ or $B_b$ in FIG. 16B. Accordingly, in the case where it is desired to obtain electric signals similar to those in the first embodiment, a positional shift between magnetic poles N and S in a first magnetic signal track $T_A$ and those in a second magnetic signal track $T_B$ is selected to be one half of the magnetic pole pitch $\lambda$, and each of an interval between the MR elements $R_{a1}$ and $R_{a2}$ and an interval between the MR elements $R_{b1}$ and $R_{b2}$ is selected to be equal to the magnetic pole pitch $\lambda$. Since the operating point is present on the slope portion of the characteristic curve, distortion in the changes in resistance value of the MR elements and the electric output signals $e_A$ and $e_B$ become small, as shown in FIGS. 16C and 16D. The present embodiment can be modified into a construction as shown by the second or third embodiment.

Figure 17:
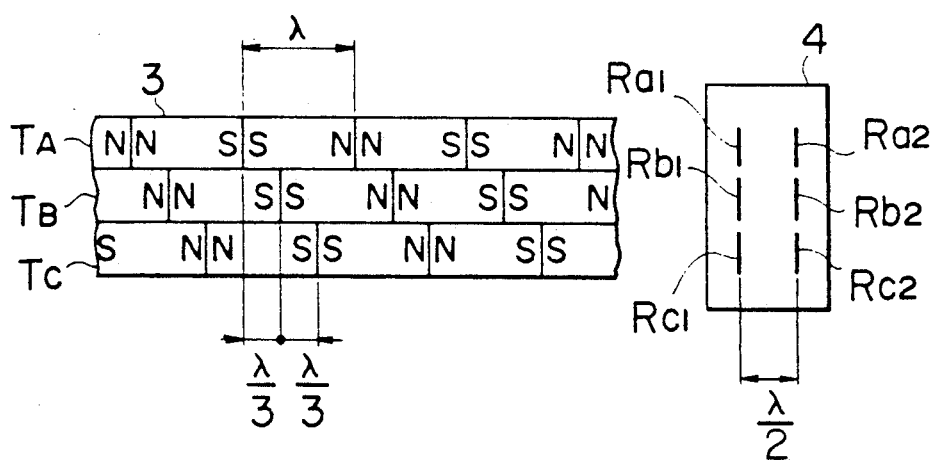
FIG. 17 is an exploded view of a magnetic rotary encoder according to a fifth embodiment of the present invention.

FIG. 17 shows an exploded view of a magnetic rotary encoder according to a fifth embodiment of the present invention in which a three-phase electric signal is obtained. In the present embodiment, three magnetic signal tracks $T_A$, $T_B$ and $T_C$ respectively corresponding to three phases are provided on a rotary drum 3. A magnetic sensor 4 includes MR elements $R_{a1}$, $R_{a2}$, MR elements $R_{b1}$, $R_{b2}$ and MR elements $R_{c1}$, $R_{c2}$ which correspond to the tracks $T_A$, $T_B$ and $T_C$, respectively. In the case of three phases, since electric output signals shifted in phase from each other by 120° in terms of electric angle are taken out, magnetic poles N and S in the magnetic signal tracks $T_A$, $T_B$ and $T_C$ are magnetized or recorded with a phase shift of $\lambda/3$ between the adjacent tracks, as shown in FIG. 17. An interval between the MR elements for each phase in the magnetic sensor 4 is $\lambda/2$. The fifth embodiment may be also modified into a construction as shown by the second or third embodiment. Further, a construction in which a bias magnetic field is applied as in the fourth embodiment can be employed in the fifth embodiment.

In the foregoing, the present invention has been explained in conjunction with a rotary encoder. However, it is obvious that the present invention can be equally applied to an encoder for detection of a linear motion.

Also, the rotary drum may be constructed as a whole by a permanent magnet such as a plastic magnet.

Further, an electric signal to be outputted is not limited to the disclosed two-phase or three-phase signal. A multi-phase electric signal such as a four-phase or five-phase signal can be obtained by increasing the number of magnetic signal tracks and the number of phases of MR elements corresponding thereto. In that case, the amount $\Delta T$ of positional shift of magnetic poles between the magnetic signal tracks is generally selected to be $$\Delta T = \frac{\lambda(m-1)}{m}$$

but is selected to be $$\Delta T = \frac{\lambda(m-1)}{2m}$$

when a bias magnetic field is applied. Here, m represents the number of phases of electric signals to be obtained. The magnetic pole pitch $\lambda$ is the phase of 180° in terms of electric angle.

A construction may be employed in which a drum is fixed while a magnetic sensor is moved. In either case where the drum is moved or where the magnetic sensor is moved, a positional relationship between the drum and the magnetic sensor can be detected in a stationary condition.

While particular embodiments of the present invention have been shown and described, it will be obvious to those skilled in the art that various changes and modifications may be made without departing from the present invention in its broader aspects.

We claim:

1. An apparatus for magnetically detecting a positional relation between first and second members the positions of which change relative to each other comprising:

a magnetic recording medium carried on said first member, two or more tracks being provided on said magnetic recording medium, corresponding to the respective phases of two or more detection signals to be detected by the apparatus, with a multiplicity of magnetic poles magnetized at the same pitch and in a direction in which the positional relation between said first and second members changes, the magnetic poles in any one of said tracks being magnetized so as to be shifted with respect to the magnetic poles in the other track by an amount corresponding to a phase difference between the detection signal for the phase which corresponds to the one track and the detection signal for the phase which corresponds to the other track; and a magnetic sensor substrate supported by said second member, said magnetic sensor substrate including a plurality of magnetoresistive elements which are respectively provided corresponding to said tracks and the electrical resistance value of each of which changes in response to a magnetic field originating from the magnetic poles in the corresponding track, the magnetoresistive elements being combined for every phase to which each track corresponds, so that an electric signal corresponding to the electrical resistance values of the combined magnetoresistive elements is generated as said detection signal, each of the magnetoresistive elements corresponding to any one of said tracks and the corresponding one of the magnetoresistive elements corresponding to the other track being disposed at the same position when viewed in the direction in which the positional relation between said first and second members changes;

wherein four magnetoresistive elements are provided corresponding to each of said tracks and at an interval equal to one half of the magnetic pole pitch, and a difference between an electric signal obtained by a circuit in which two adjacent elements of the four magnetoresistive elements at one side from the center thereof are connected in series with each other and an electric signal obtained by a circuit in which two other adjacent elements of the four magnetoresistive elements at the other side from the center thereof are connected in series with each other is outputted as said detection signal.

2. An apparatus for magnetically detecting a positional relation between first and second members the positions of which change relative to each other comprising:

a magnetic recording medium carried on said first member, two or more tracks being provided on said magnetic recording medium, corresponding to the respective phases of two or more detection signals to be detected by the apparatus, with a multiplicity of magnetic poles magnetized at the same pitch and in a direction in which the positional relation between said first and second members changes, the magnetic poles in any one of said tracks being magnetized so as to be shifted with respect to the magnetic poles in the other track by an amount corresponding to a phase difference between the detection signal for the phase which corresponds to the one track and the detection signal for the phase which corresponds to the other track; and a magnetic sensor substrate supported by said second member, said magnetic sensor substrate including a plurality of magnetoresistive elements which are respectively provided corresponding to said tracks and the electrical resistance value of each of which changes in response to a magnetic field originating from the magnetic poles in the corresponding track, the magnetoresistive elements being combined for every phase to which each track corresponds, so that an electric signal corresponding to the electrical resistance values of the combined magnetoresistive elements is generated as said detection signal, each of the magnetoresistive elements corresponding to any one of said tracks and the corresponding one of the magnetoresistive elements corresponding to the other track being disposed at the same position when viewed in the direction in which the positional relation between said first and second members changes, the magnetoresistive elements being electrically combined in a bridge circuit and positioned on the magnetic sensor substrate with respect to one another and the corresponding track so as to enable elimination of even-order harmonic distortion in said detection signal.

3. An apparatus according to claim 1, wherein a bias is magnetically applied to each of said magnetoresistive elements.

4. An apparatus according to claim 1 wherein the amount of shift of the magnetic poles between said tracks is selected to be $\lambda(m-1)/2m$, where m is number of said tracks and $\lambda$ is magnetic pole pitch.

5. An apparatus according to claim 3 wherein the amount of shift of the magnetic poles between said tracks is selected to be $\lambda(m-1)/m$, where m is number of said tracks and $\lambda$ is magnetic pole pitch.

6. An apparatus according to claim 2, wherein a bias is magnetically applied to each of said magneto-resistive elements.

7. An apparatus according to claim 2, wherein the amount of shift of the magnetic poles between said tracks is selected to be $\lambda(m-1)/2m$, where m is the number of said tracks and $\lambda$.

8. An apparatus according to claim 6, wherein the amount of shift of the magnetic poles between said tracks is selected to be $\lambda(m-1)/2m$, where m is number of said tracks and $\lambda$ is magnetic pole pitch.

* * * * *